United States Patent
Bach et al.

(10) Patent No.: US 11,695,304 B2
(45) Date of Patent: Jul. 4, 2023

(54) ROTOR FOR AN ELECTRICAL MACHINE, ELECTRICAL MACHINE FOR DRIVING A VEHICLE, AND VEHICLE

(71) Applicant: Valeo Siemens eAutomotive Germany GmbH, Erlangen (DE)

(72) Inventors: Regina Bach, Bad Neustadt a.d.Saale (DE); Boris Dotz, Bad Neustadt a.d.Saale (DE)

(73) Assignee: Valeo Siemens eAutomotive Germany GmbH, Erlangen (DE)

( * ) Notice: Subject to any disclaimer, the term of this patent is extended or adjusted under 35 U.S.C. 154(b) by 0 days.

(21) Appl. No.: 17/451,447

(22) Filed: Oct. 19, 2021

(65) Prior Publication Data

US 2022/0131430 A1    Apr. 28, 2022

(30) Foreign Application Priority Data

Oct. 23, 2020   (DE) ..................... 10 2020 127 930.2

(51) Int. Cl.
*H02K 1/26*   (2006.01)
*B60L 50/51*  (2019.01)
(Continued)

(52) U.S. Cl.
CPC ............. *H02K 1/265* (2013.01); *B60L 50/51* (2019.02); *H02K 3/18* (2013.01); *H02K 3/487* (2013.01)

(58) Field of Classification Search
CPC .................................................... B60L 50/51
(Continued)

(56) References Cited

U.S. PATENT DOCUMENTS 4,075,522 A * 2/1978 Hoffman ................ H02K 3/487
                                                      310/216.115
5,818,141 A * 10/1998 Cho ...................... H02K 17/165
                                                      310/212

(Continued)

FOREIGN PATENT DOCUMENTS

DE      10300796 A1    7/2004
DE    102004062162 A1  7/2006
(Continued)

OTHER PUBLICATIONS

German Search Report issued in corresponding German Application No. 10 2020 127 930.2, dated Jun. 4, 2021 (8 pages).

(Continued)

*Primary Examiner* — Rashad H Johnson
(74) *Attorney, Agent, or Firm* — Osha Bergman Watanabe & Burton LLP

(57) ABSTRACT

Rotor for an electrical machine has a rotor core with a plurality of radially outwardly extending rotor legs, a number of exciter windings corresponding to the number of rotor legs, each wound around one of the rotor legs, and a separating device, having a number of separating portions corresponding to the number of rotor legs, which are arranged between a respective pair of adjacent exciter windings and extend axially between two opposing end faces of the rotor, a first annular connecting portion which connects together the separating portions at one of the end faces, and a second annular connecting portion which connects together the separating portions at the other of the end faces. The separating device is formed by a first part and by a second part which are joined together by means of a form-fit and/or force-fit connection, wherein the first part comprises at least the first connecting portion and at least partially the (Continued)

Figures 1, 2:
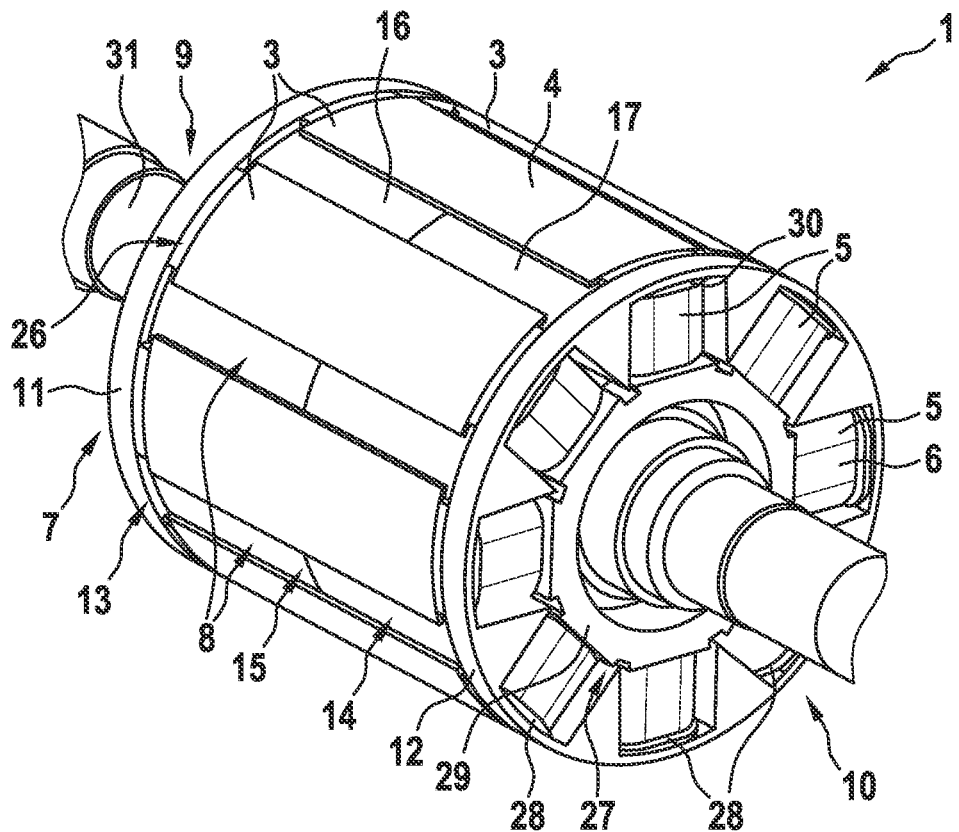

separating portions, and the second part comprises at least the second connecting portion.

11 Claims, 2 Drawing Sheets

(51) Int. Cl.
*H02K 3/18* (2006.01)
*H02K 3/487* (2006.01)

(58) Field of Classification Search
USPC .......................................... 310/109, 156.01
See application file for complete search history.

(56) References Cited

U.S. PATENT DOCUMENTS

| | | | | |
|---|---|---|---|---|
| 8,110,958 B2* | 2/2012 | Kalavsky | ............... | H02K 5/128 |
| | | | | 310/85 |
| 8,508,091 B2* | 8/2013 | Yang | ...................... | H02K 1/278 |
| | | | | 310/156.81 |
| 11,283,322 B2* | 3/2022 | Tavakoli | ................. | H02K 3/487 |
| 11,336,142 B2* | 5/2022 | Eckstein | ................ | H02K 1/265 |
| 11,489,379 B2* | 11/2022 | Kislev | .................... | H02K 21/22 |
| 2009/0015084 A1* | 1/2009 | Kalavsky | ............... | H02K 5/128 |
| | | | | 310/89 |
| 2017/0338711 A1* | 11/2017 | Yu | ............................ | H02K 5/04 |
| 2021/0159751 A1* | 5/2021 | Tavakoli | .................. | H02K 3/51 |
| 2022/0131430 A1* | 4/2022 | Bach | ....................... | B60L 50/51 |

FOREIGN PATENT DOCUMENTS

| | | |
|---|---|---|
| DE | 202016004885 U1 | 8/2016 |
| DE | 102018202945 A1 | 8/2019 |
| EP | 2717435 A2 | 4/2014 |
| KR | 10 2015 0 124 762 A | 11/2015 |
| WO | 2019-224036 A1 | 11/2019 |

OTHER PUBLICATIONS

European Search Report in corresponding Application No. 21202784. 1, dated Mar. 9, 2022 (11 pages).

* cited by examiner

ROTOR FOR AN ELECTRICAL MACHINE, ELECTRICAL MACHINE FOR DRIVING A VEHICLE, AND VEHICLE

The present invention concerns a rotor for an electrical machine. In addition, the invention concerns an electrical machine for driving a vehicle, and a vehicle.

DE 10 2004 062 162 A1 discloses an electrical machine with a salient-pole-generator rotor having exciter windings, wherein pole winding supports and displacement bodies are present in the pole gaps. The displacement body is arranged at the pole winding connector and divided into several axial portions in the axial direction.

In rotors with rotor legs around which exciter windings are wound, separating portions of a separating device are arranged between adjacent rotor legs and serve firstly for electrical isolation of the exciter windings and secondly to maintain their shape during rotational operation. Also substantial radial forces, in particular centrifugal forces, act on the end faces of the exciter windings, known as the winding heads. For mechanical stabilisation against such radial forces, already a solid casting of the rotor has been proposed, but this is costly and complex. The alternative use of additional components such as reinforcing rings, and fixings by means of tension rods or bolts, is costly and complex to install.

The invention is based on the object of indicating an improved possibility of stabilising a rotor during its operation.

This object is achieved according to the invention by a rotor for an electrical machine, having a rotor core with a plurality of radially outwardly extending rotor legs; a number of exciter windings corresponding to the number of rotor legs, each wound around one of the rotor legs; and a separating device having a number of separating portions corresponding to the number of rotor legs, which are arranged between a respective pair of adjacent exciter windings and extend axially between two opposing end faces of the rotor, a first annular connecting portion which connects together the separating portions at one of the end faces, and a second annular connecting portion which connects together the separating portions of the other of the end faces; wherein the separating device is formed by a first part and by a second part which are joined together by means of a form-fit and/or force-fit connection, wherein the first part comprises at least the first connecting portion and at least partially the separating portions, and the second part comprises at least the second connecting portion.

The invention is based on the consideration of functionally integrating, at least partially, at least the first annular connecting portion and the separating portions in a first part of the separating device, and connecting this by form fit and/or force fit to the second part of the separating device which comprises at least the second connecting portion. The connection joining together the first part and the second part of the separating device may be provided at a suitable point along the axial extent of the separating device or the rotor. This allows the first part to be axially inserted in spaces between the rotor legs and then connected, in particular releasably, to the second part at a suitable point. In this way, the first part ensures both a shape retention of the exciter winding and a mechanical support against radial forces which act on the winding heads of the exciter winding.

Because of this mechanical stabilisation, the function of the rotor or the electrical machine comprising this may be guaranteed even under high mechanical loads, in particular at high rotation speeds. The rotor according to the invention is easy to manufacture, since with the separating device provided according to the invention, several functions are integrated in one component and simple handling becomes possible, which saves production time. At the same time, the rotor according to the invention allows winding expansion to be minimised.

The rotor core of the rotor according to the invention may be formed by a plurality of axially layered, individual plates which are connected together in rotationally fixed fashion. The rotor core may accordingly also be known as a plate packet.

Preferably, the plate packet has an axial passage opening in which in particular a shaft of the rotor is arranged. A respective rotor leg with an exciter winding wound around this may form a pole of the rotor. It is particularly preferred if each rotor leg has a pole shoe on the radial outside. The pole shoe may extend further in the circumferential direction than the regions of the rotor leg around which the exciter windings are wound. In a preferred embodiment, the rotor according to the invention has at least two, preferably at least four, particularly preferably at least eight rotor legs, and/or at most twenty, preferably at most sixteen, particularly preferably at most twelve rotor legs. It is particularly preferred if the rotor has precisely eight rotor legs.

In a rotor according to the invention, it is preferred if a respective separating portion is divided in the axial direction into a first partial separating portion and a second partial separating portion, wherein the first part of the separating device comprises the first partial separating portion of a respective separating portion, and the second part of the separating device comprises the second partial separating portion of a respective separating portion. In this case, the second part of the separating device also partially comprises a respective separating portion so that the second part also integrates the functions of a connecting portion and a separating portion. The separating portions are also divided at a predefined axial position. Preferably, the connection is configured as one which joins together the partial separating portions of a respective separating portion.

In a refinement, it may be provided that each partial separating portion comprises a frontal first end and a second end axially opposite the first end, and the connection between the first part of the separating device and the second part of the separating device is formed by the second ends of the partial separating portions of a respective separating portion. The connection is thus preferably implemented at the second ends, facing away from the front ends, of the partial separating portions of a respective separating portion.

In order to form the form-fit and/or force-fit connection, the second ends of the partial separating portions of a respective separating portion preferably engage in one another. This allows a high stability of the separating device even under axial forces acting thereon.

Alternatively or additionally, it may be provided that the second end of one of the partial separating portions of the respective separating portion has on the radial outside an axial first protrusion, and the second end of the other of the partial separating portions of the respective separating portion has on the radial inside an axial second protrusion. These protrusions may overlap in a predefined axial region.

In a refinement, it may be provided that the first protrusion has a radially inwardly pointing first extension, and the second protrusion has a radially outwardly pointing second extension which engages in the first extension. These extensions may also overlap in a predefined radial region. It is preferred if the first extension is axially wider than the second extension.

In general, with the rotor according to the invention, it is preferred if the connection is implemented by a hook structure or a hook design.

With respect to the division of the separating portions into partial separating portions, it is preferred if the first partial separating portion and the second partial separating portion of a respective separating portion each extend over at least 25 percent, preferably at least 35 percent, particularly preferably 45 percent of the axial extent of the exciter windings. Thus a substantially axially central division into the partial separating portions is preferred, so that these may be guided from a respective end face, in particular with the second end at the front, between the exciter windings, in order to form the connection at a substantially axially central position.

A particularly high degree of integration may be achieved if the first part of the separating device is made of one piece and/or of identical material. Alternatively or additionally, the second part of the separating device may be made of one piece and/or of identical material. A respective part is here preferably made of plastic, in particular as a moulding.

In particular, with the rotor according to the invention, viewed from the end faces, the separating portions have a wedge-shaped base surface, wherein preferably a tip of the base surface points radially inward. The separating portions may point radially inward from a radial inner face of the annular connecting portion, and then in particular also have a base surface in the form of a circle sector. Also, the connecting portions preferably extend radially further outward than the separating portions.

In an advantageous refinement of the rotor according to the invention, this may furthermore comprise two terminating devices which are each arranged at a respective one of the end faces of the rotor core and each comprise terminating elements which extend between the rotor leg and the exciter winding. The terminating device in particular allows the winding heads to be formed in a material-protective fashion, since these need not rest directly on the rotor core but axially outwardly on the terminating elements. The terminating elements are therefore preferably configured rounded in regions around which the exciter winding is wound.

Preferably, the terminating devices furthermore comprise an annular body which surrounds the passage opening of the rotor core, and from which the spacer elements extend radially outward. The annular body may extend radially further outward than the exciter winding.

In a preferred embodiment, it is provided that the connecting portions of the separating device rest radially outwardly on the terminating devices, in particular on a shoulder of a respective terminating element formed in the circumferential direction. This forms a snugly fitting support face for the connecting portions on the terminating devices in order to achieve a good support against the radial forces.

The object on which the invention is based is furthermore achieved by an electrical machine for driving a vehicle, comprising a stator and a rotor according to the invention which is rotatably mounted inside the stator. The electrical machine is preferably configured as an electric motor. The electrical machine is preferably an electrically excited, in particular separately excited, synchronous machine The object on which the invention is based is also achieved by a vehicle comprising an electrical machine according to the invention, wherein the electrical machine is configured for driving the vehicle. The vehicle may for example be a battery electric vehicle (BEV) or a hybrid vehicle.

Figure 3:
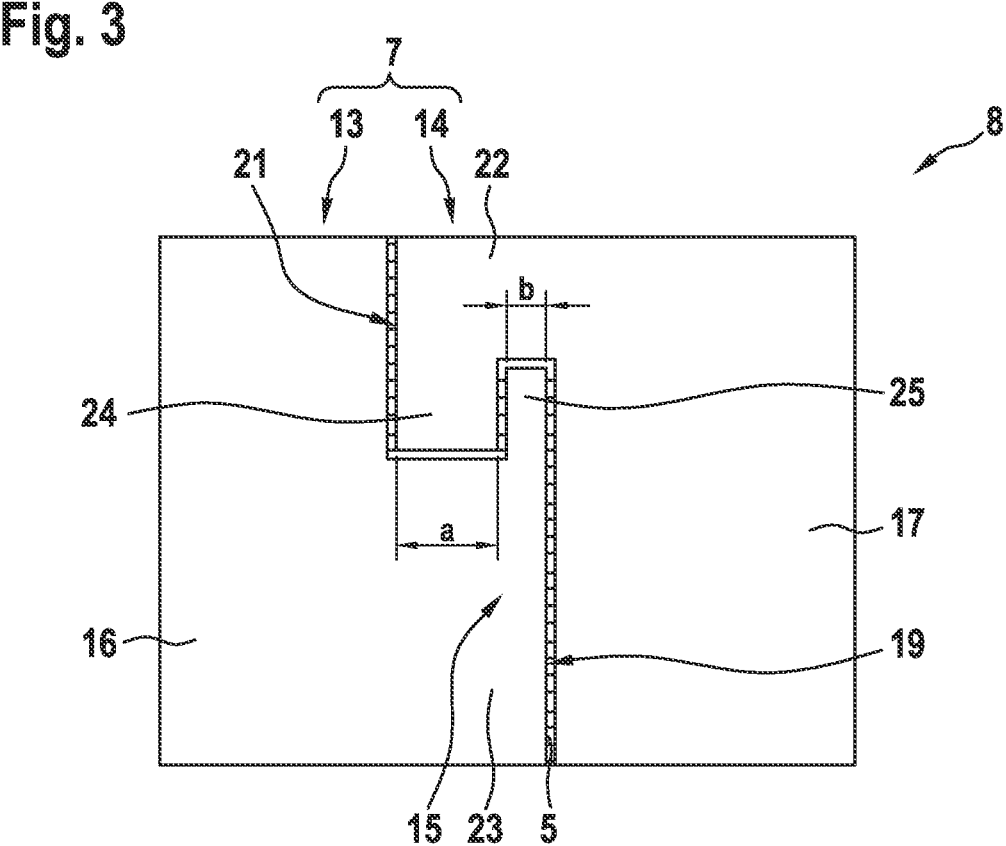
Figure 4:
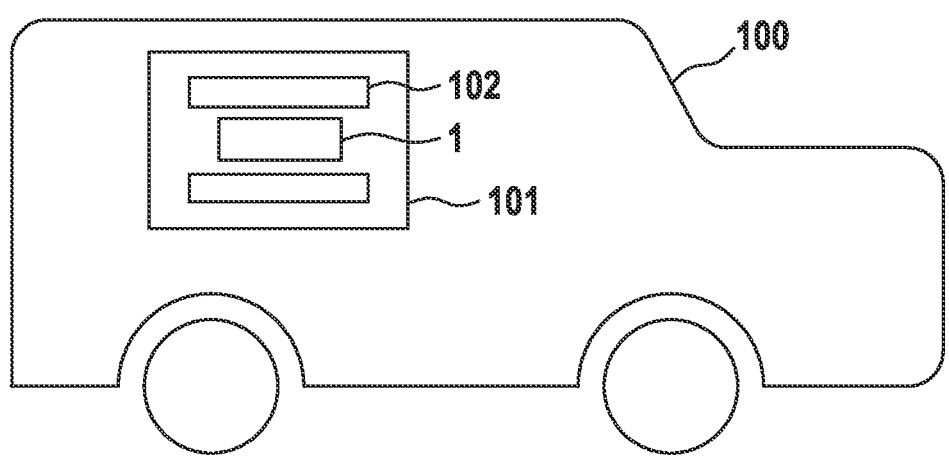

Further advantages and details of the present invention emerge from the exemplary embodiments described below and on the basis of the drawings. These are schematic illustrations and show:

FIG. 1 a perspective view of an exemplary embodiment of the rotor according to the invention;

FIG. 2 a perspective sectional view of the rotor;

FIG. 3 a detail view of an extract III in FIG. 2 in the region of the connection between the first part and the second part of the separating device of the rotor; and FIG. 4 a basic diagram of an exemplary embodiment of a vehicle according to the invention with an exemplary embodiment of the electrical machine according to the invention.

FIG. 1 and FIG. 2 each show an exemplary embodiment of a rotor 1, wherein FIG. 1 is a perspective view and FIG. 2 a perspective sectional view.

The rotor 1 has a rotor core 2 with a plurality of radially outwardly extending rotor legs 3. Pole shoes 4, which widen the rotor leg 3 on both sides in the circumferential direction, may be formed at the radial ends of the rotor legs 3. The rotor core 2 may be configured as a plate packet. In the present exemplary embodiment, as an example, eight rotor legs 3 are provided.

In addition, the rotor 1 has a number of exciter windings 5 corresponding to the number of rotor legs 3, each wound around one of the rotor legs 3. Axial ends of the exciter windings 5 are also known as winding heads 6.

Also, the rotor 1 has a separating device 7. The separating device 7 has a number of separating portions 8 corresponding to the number of rotor legs 3, which are arranged between a respective pair of adjacent exciter windings 5 and extend axially between two opposing end faces 9, 10 of the rotor 1. Also, the separating device 7 has a first annular connecting portion 11 which connects together the separating portions 8 at one of the end faces 9, 10, here for example at the first end face 9, and a second annular connecting portion 12 which connects together the separating portions 8 at the other of the end faces 9, 10, i.e. here at the second end face 10. The surfaces of the separating portions 8, as evident in FIG. 1 and FIG. 2, may here be formed wedge-shaped with a radially inwardly pointing tip.

The separating device 7 is formed by a first part 13 and a second part 14, which are joined together by means of a form-fit and/or force-fit connection 15. The connection 15, as shown here as an example, may be formed by a hook structure or a hook design. The first part 13 here comprises the first connecting portion 11 and at least partially the separating portions 8. The second part 14 comprises at least the second connecting portion 12, and for example in the present exemplary embodiment, also partially the separating portions 8.

A respective separating portion may be divided in the axial direction into a first partial separating portion belonging to the first part 13, and a second partial separating portion 17 belonging to the second part 14. The first partial separating portion 16 may have a first front end 18 and a second end 19 axially opposite the first end 18, and the second partial separating portion 17 may have a first front end 20 and a second end 21 axially opposite the first end 20.

As in the present exemplary embodiment, the parts 13, 14 may each be made of one piece and of identical material. In particular, the connecting portion 11, 12 and the partial separating portions 16, 17 of a respective part 13, 14 are made of one piece and of identical material.

FIG. 3 is a detail view of an extract III in FIG. 2 of one of the separating portions 8 in the region of the connection 15.

The connection 15 between the first part 13 and the second part 14 of the separating device 7 may be formed by the second ends 19, 21 of the partial separating portions 16, 17 of the respective separating portion 8, wherein the second ends 19, 21 of the respective separating portion 8 preferably engage in one another. The second end 21 of one of the partial separating portions, here the second partial separating portion 17, has optionally on the radial outside an axial first protrusion 22, whereas the second end 19 of the other partial separating portion, i.e. the first partial separating portion 16, may have on the radial inside an axial second protrusion 23. The first protrusion 22 may in turn have a radially inwardly pointing first extension 24, and the second protrusion 23 a radially outwardly pointing second extension 25. The extensions 24, 25 engage behind one another. In the present exemplary embodiment, an axial length a of the first extension 24 is wider than an axial length b of the second extension 25, so that the first extension 24 is axially wider than the second extension 25.

In the present exemplary embodiment, the connection 15 is formed substantially at an axially central position of the rotor core 2. Because of the protrusions 22, 23, the partial separating portions 16, 17 here extend over more than 50% of the axial extent of the exciter windings 5. A division between the first partial separating portion 16 and the second partial separating portion 17 may however also be provided at another axial position, so that the partial separating portions 16, 17 may extend only over at least 25 percent, preferably 35 percent, particularly preferably 45 percent of the axial extent of the exciter windings 5.

Again with reference to FIG. 1 in FIG. 2, the rotor 1 optionally comprises two terminating devices 26, 27 which are each arranged at a respective one of the end faces 9, 10 of the rotor core 2, and each have a number of terminating elements 28 corresponding to the number of rotor legs 3. These each extend between one of the rotor legs 3 and the exciter winding 5 wound around this. The terminating elements 28 may be arranged on an annular body 29 of a respective terminating device 27, 26. As evident from FIG. 1 and FIG. 2, the connecting portions 11, 12 of the separation device 7 may rest radially outwardly on the terminating devices 26, 27. For this, these may each have a shoulder 30 formed in the circumferential direction on the respective terminating element 28.

Finally, FIG. 1 and FIG. 2 also show a shaft 31 of the rotor 1 which is attached to the rotor core 2 by means of a press fit and extends through axial passage openings of the rotor core 2 and terminating devices 26, 27, in particular through a respective annular body 29.

FIG. 4 is a basic diagram of an exemplary embodiment of a vehicle 100, which in particular is configured as a battery electric vehicle (BEV) or as a hybrid vehicle. To drive the vehicle 100, the latter comprises an exemplary embodiment of an electrical machine 101. The electrical machine 101 comprises a stator 102 and a rotor 1 according to the exemplary embodiment described above, which is rotatably mounted inside the stator 102. The electrical machine 101 may be configured as an electric motor and/or as an electrically excited, in particular separately excited synchronous machine.

The invention claimed is:

1. A rotor for an electrical machine, comprising:
   a rotor core with a plurality of radially outwardly extending rotor legs;
   a number of exciter windings corresponding to the number of rotor legs, each wound around one of the rotor legs; and
   a separating device, having:
   a number of separating portions corresponding to the number of rotor legs, which are arranged between a respective pair of adjacent exciter windings and extend axially between two opposing end faces of the rotor,
   a first annular connecting portion which connects together the separating portions at one of the end faces, and
   a second annular connecting portion which connects together the separating portions at the other of the end faces,
   wherein the separating device is formed by a first part and by a second part which are joined together by means of a form-fit and/or force-fit connection, wherein the first part comprises at least the first connecting portion and at least partially the separating portions, and the second part comprises at least the second connecting portion,
   wherein a respective separating portion is divided in an axial direction into a first partial separating portion and a second partial separating portion, wherein the first part of the separating device comprises the first partial separating portion of the respective separating portion, and the second part of the separating device comprises the second partial separating portion of the respective separating portion,
   wherein each of the first and second partial separating portions comprises a frontal first end and a second end axially opposite the first end, and the connection between the first part of the separating device and the second part of the separating device is formed by the second ends of the partial separating portions of the respective separating portion,
   wherein the second end of one of the partial separating portions of the respective separating portion is on the radial outside of an axial first protrusion, and the second end of the other of the partial separating portions of the respective separating portion is on the radial inside of an axial second protrusion, and
   wherein the first protrusion has a radially inwardly pointing first extension, and the second protrusion has a radially outwardly pointing second extension which engages in the first extension.

2. The rotor according to claim 1, wherein the second ends of the partial separating portions of the respective separating portion engage in one another.

3. The rotor according to claim 1, wherein the first extension is axially wider than the second extension.

4. The rotor according to claim 1, wherein the first partial separating portion and the second partial separating portion of the respective separating portion each extend over 45 percent of an axial extent of the exciter windings.

5. The rotor according to claim 1, wherein the connection is implemented by a hook structure.

6. The rotor according to claim 1, wherein the first part of the separating device is made of one piece and/or of identical material, and/or the second part of the separating device is made of one piece and/or of identical material.

7. The rotor according to claim 1, wherein viewed from the end faces, the separating portions have a wedge-shaped base surface.

8. The rotor according to claim 1, further comprising: two terminating devices which are each arranged at a respective one of the end faces of the rotor core and each comprise terminating elements which extend between the rotor leg and the exciter winding.

9. The rotor according to claim 8, wherein the connecting portions of the separating device rest radially outwardly on the terminating devices on a shoulder formed in a circumferential direction of a respective terminating element.

10. An electrical machine for driving a vehicle, comprising a stator; and a rotor according to claim 1, which is rotatably mounted inside the stator.

11. A vehicle comprising: an electrical machine according to claim 10, wherein the electrical machine is configured to drive the vehicle.

* * * * *